Patented July 1, 1952

2,602,064

UNITED STATES PATENT OFFICE 2,602,064

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application May 3, 1950, Serial No. 159,863

10 Claims. (Cl. 252—342)

The present invention is a continuation-in-part of my co-pending application, Serial No. 104,801, filed July 14, 1949, now Patent No. 2,552,528, dated May 15, 1951. Said aforementioned co-pending application describes the resolution of petroleum emulsions by the oxypropylated derivatives of certain polyhydric materials free from a radical having at least 8 uninterrupted carbon atoms. Additionally said aforementioned co-pending application points out that certain derivatives, for instance, the esters derived from polycarboxy acids can be employed for the same purpose, i. e., process for breaking petroleum emulsions.

Complementary to the above aspect of the invention herein disclosed is my companion invention concerned with the new chemical products or compounds used as the demulsifying agents in said aforementioned processes or procedures, as well as the applications of such chemical compounds, products, or the like, in various other arts and industries, along with the method for manufacturing said new chemical products or compounds which are of outstanding value in demulsification. See my co-pending application, Serial No. 159,864, filed May 3, 1950, now abandoned.

My invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts from pipeline oil.

Demulsification as contemplated in the present application includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the present invention is concerned with the breaking of petroleum emulsions by means of the acidic fractional esters of certain polyol ethers hereinafter described in detail. Such ethers are obtained by reacting triols, such as glycerol or the like, and particularly water-soluble, xylene-insoluble triols with propylene oxide so as to yield a water-insoluble xylene-soluble triol containing the repetitious divalent linkage —$C_3H_6O$—. Indeed, it is preferable that the oxypropylated derivatives not only be water-insoluble and xylene-soluble but be kerosene-soluble. A plurality of propylene oxide is used in molal ratio to the triol so as to convert the initial reactant, preferably one which is water-soluble and xylene-insoluble, into an end product which is water-insoluble and xylene-soluble. For instance, the herein described oxypropylated resultants, or more correctly, products of oxypropylation reaction, since they invariably and inevitably represent cogeneric mixtures rather than a single component, when mixed with distilled water so as to give a 5% solution, suspend after a fashion during vigorous agitation but on being allowed to stand in a quiescent state immediately separate out so that within a short length of time, for instance within a few minutes to several hours, all or substantially the big bulk of material has separated from the aqueous solution or suspension. In fact, in the higher stages of oxypropylation the materials obtained seem to go into water at room temperature with considerable difficulty and if the water happens to be warm, for instance, at a temperature of 50°, 60°, or 70° C., the materials are even less soluble. An example of a product difficult to disperse even with vigorous shaking and which, even so, does not stay dispersed, is the resultant obtained by treating one mole of sorbitol with 200 moles of propylene oxide. Reference as to solubility is in ordinary cold water at approximately room temperature, for instance, 22.5° C., or thereabouts. Solubility in xylene refers to solubility at ordinary temperature and products herein specified are soluble in xylene so as to form a 5% solution readily.

Such oxypropylation products, which are still triols, are reacted with polycarboxy acids and particularly dicarboxy acids, to yield acidic fractional esters free from any hydroxyl radicals but having a plurality of carboxyl radicals.

As pointed out in the hereto appended claims the invention is concerned with a process for breaking petroleum emulsions of the water-in-oil type characterized by subjecting the emulsion to the action of a demulsifier including a monomeric acidic fractional ester of the following structure:

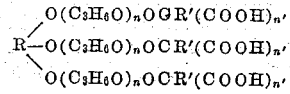

in which R is the radical of a water-soluble triol R(OH)₃ whose elements consist of carbon, hydrogen and oxygen only, and R' is the polycarboxy acid radical of the conventional polycarboxy acid

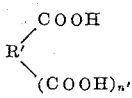

in which $n'$ represents the whole numbers 1 to 2, and $n$ represents a whole number varying from 6 to 30; with the proviso that $n$ be the statistical average based on the amount of propylene oxide reacted with the initial triol R(OH)₃; said triol being free from any radical having at least 8 uninterrupted carbon atoms; and with the further proviso that the oxypropylated triol

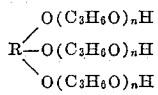

be water-insoluble and xylene-soluble, and that the statistical average molecular weight of said oxypropylated triols be within the range of 1,000 to 5,000.

For convenience, what is said hereinafter will be divided into four parts:

Part 1 is concerned with a description of various triols which can be employed;

Part 2 is concerned with the preparation of the oxypropylated derivatives which, as previously stated, are still triols;

Part 3 is concerned with the conversion of the triols into the acidic fractional esters as previously described; and Part 4 is concerned with the use of the acidic esters and emulsifiers for petroleum emulsions of the water-in-oil type.

PART 1

The most common triol most readily available is, of course, glycerol. Other comparatively simple triols are relatively well known, such as methylglycerol, trimethylol propane, the trimethylol derivatives of higher alkanes, etc. Another example is 1,2,6-hexanetriol. It is to be noted that this triol, although it has 6 carbon atoms, is still water-miscible. Triols are readily obtainable by treating a monohydric alcohol having 1 to 7 carbon atoms, such as methyl alcohol, ethyl alcohol, propyl alcohol, butyl alcohol, etc., with 2 moles of glycide or methylglycid, or one mole of glycide and one mole of methylglycid. Another procedure involves treatment of a glycol (diol) with one mole of glycide, or methylglycid. Suitable glycols include, among others, ethyleneglycol, diethyleneglycol, triethyleneglycol, propyleneglycol, dipropyleneglycol, polypropyleneglycol 400 (400 average molecular weight), polypropylene glycol 750 (750 average molecular weight), etc. Specific examples include butanediol-1,3; pentanediol-2,4; 2-methylpentane-2,4; and hexanediol-2,5.

Attention is directed to 2-ethylhexanediol-1,3. This particular product is not included as a starting material for the reason that it has 8 uninterrupted carbon atoms in a single radical. It is to be noted, however, that even this product is soluble in water to the extent of about 4% at ordinary temperature. As far as I am aware all the diols having less than 8 carbon atoms are invariably water-soluble and may or may not be soluble in xylene. As previously stated, the preferred initial reactant is one which is not only water-soluble but xylene-insoluble.

Comparable to derivatives obtained from monohydric alcohols are those obtained by the same procedure from methoxyglycols or other etherized glycols. Reference is made particularly to methoxy polyethyleneglycol 350 to 550. These products are sold by Carbon & Carbide Chemicals Corporation, New York.

Obviously, triols can be obtained by the etherization of a polyhydroxylated material having more than 4 hydroxyl radicals as, for example, diglycerol, triglycerol, pentaerythritol, sorbitan, sorbitol, mannitan, mannitol, etc. One example is the methyl ether of diglycerol, or the methyl ether of sorbitan. Needless to say, triols, such as glycerol or the other triols previously mentioned, or derived by the various procedures described, can be treated with alkylene oxides, such as ethylene oxide, propylene oxide, butylene oxide, or a mixture of such oxides, to yield triol ethers which are suitable as initial materials in the herein described reactions.

Suitable triols are not limited to acyclic compounds. Derivatives of phenol and cresol may be employed, as well as the comparable hydroaromatic compounds, i. e., cyclohexanol and methylcyclohexanol. Such monohydric compounds can be treated with glycide or methylglycid in the manner previously described, or such compounds or other suitable cyclic compounds can be subjected to reaction with ethylene oxide, propylene oxide, or the like, and then subjected to treatment with glycide or methylglycid. In other words, the triols employed are not limited to aliphatic triols but may involve aromatic radicals, alicyclic radicals, etc.

Another procedure which can be applied to an aliphatic, alicyclic, or aromatic compound, or for that matter to an alkylaryl compound, is the combination of epichlorohydrin with a monohydroxylated compound followed by dehydrochlorination so as to form an epoxy ring as exemplified by glycidyl phenyl ether, or glycidyl isopropyl ether. Needless to say, instead of having a phenyl ether one may have the ether derived from cyclohexyl ether, the benzyl ether, or the ether of alcohols having 7 carbon atoms or less, such as methyl alcohol, butyl alcohol or hexyl alcohol. Such glycidyl ethers containing the epoxy ring can then be reacted with simpler glycols or dihydroxylated compounds of the kind previously enumerated. The reaction between the epoxy reactant and the dihydroxylated material may be within the ratio of one mole of epoxy compound per mole of dihydroxylated material, or two moles, or even more. Glycidyl isopropyl ether and glycidyl phenyl ether are obtainable on the open market.

Treatment of a triol with propylene oxide in the initial stage, that is, in the preparation of the original reactant has no particular significance unless obviously oxypropylation is followed by some other step, such as oxyethylation, treatment with glycide, butylene oxide, or the like. The reason is obviously that such oxypropylation would be only equivalent to the more extensive oxypropylation step which is involved prior to esterification.

PART 2

As has been pointed out previously, triols are readily available, or can be obtained by various procedures and particularly by the use of an alkylene oxide such as ethylene oxide, propylene oxide, and particularly glycide or methylglycid. Obviously, the equipment suitable for oxypropylation is also suitable for oxyethylation and will serve, if desired, to use with glycide. I have prepared a large number of such triols of the kind described in Part 1, preceding, on a laboratory scale varying from a few hundred grams or less to somewhat larger amounts. This same applies to the preparation of the oxypropylated compounds with which the second part is concerned.

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment, the design is such as to use any of the customarily available alkylene oxides, i. e., ethylene oxide, propylene oxide, butylene oxide, glycide, epichlorohydrin, styrene oxide, etc. In the description of the equipment it becomes obvious that it is adapted for oxyethylation as well as oxypropylation.

Oxypropylations are conducted under a wide variety of conditions, not only in regard to presence or absence of catalyst, kind of catalyst previously described, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximately the boiling point of water or slightly above, as for example 115° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low temperature-low reaction rate oxypropylations have been described very completely in U. S. Patent No. 2,448,664 to H. R. Fife, et al., dated September 7, 1948. Low temperature, low pressure oxypropylations are particularly desirable where the compound being subjected to oxypropylation contains one, two or three points of reaction only, such as monohydric alcohols, glycols and triols.

Since low pressure, low temperature reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 110° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment which is designed to permit continuous oxyalkylation whether it be oxypropylation or oxyethylation. With certain changes as will be pointed outer hereinafter the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately one gallon and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge; manual vent line; charge hole for initial reactants; at least one connection for introducing the alkylene oxide, such as propylene or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances a larger autoclave was used, i. e., one having a capacity ranging in the neighborhood of 1¾ gallons.

Continuous operation, or substantially continuous operation, was achieved by the use of a separate container to hold the alkylene oxide being employed, particularly propylene oxide. The container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This also applied to the nitrogen line, which was used to pressure the bomb reservoir. To the extent that it was required, any other usual conventional procedure or addition which provided greater safety was used, of course, such as safety glass, protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was slow under such conditions. Numerous reactions were conducted in which the time varied from one day (24 hours) up to three days (72 hours). In some instances the reaction may take place in considerably less time, i. e., 24 hours or less. The minimum time recorded was a 24-hour period. Reactions indicated as being complete in 24 hours may have been complete in a lesser period of time in light of the automatic equipment employed. In the addition of propylene oxide, in the autoclave equipment as far as possible the valves were set so all the propylene oxide if fed continuously would be added at a rate so that the predetermined amount would react within the first 15 hours of the 24-hour period. This meant that if the reaction was interrupted automatically for a period of time for pressure to drop or temperature to drop the predetermined amount of oxide would still be added in most instances in a 24-hour period. Sometimes where the addition was a comparatively small amount over a 24-hour period there would be an unquestionable speeding up of the reaction.

When operating at a comparatively high temperature, for instance, between 150° to 200° C., an unreacted alkylene oxide, such as propylene oxide, makes its presence felt in the increase in pressure or the consistency of a high pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counter-balance scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. Incidentally, the ratios on the table are amounts as taken from the scale and the actual amounts of propylene oxide may have varied slightly one way or the other insofar that the scale readings at approximately 1,000 grams may have been off 5 to 10 grams, and at 2,000 grams may have been off 15 to 25 grams.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gauges, check valves and entire equipment. As far as I am aware at least two firms, and possibly three, specialize in autoclave equipment such as I have employed in the laboratory, and are prepared to furnish equipment of this same kind. This point is simply made as a precaution in the direction of safety. Oxyalkylations, particularly involving ethylene oxide, glycide, propylene oxide, etc., should not be conducted except in equipment specifically designed for the purpose.

A word can be included in regard to the use of glycide. As previously pointed out some triols are obtained by use of glycide or methylglycid. In this instance, pressure is not involved and no effort was made to use an automatically controlled long-time reaction period (slow reaction rate). Indeed, in the used of a number of initial reactants with glycide the entire equipment was used almost as if it were an ordinary piece of non-pressure laboratory equipment since such reactions can be so conducted. Due to the high boiling point of glycide one can readily employ a separable glass resin pot as described in U. S. Patent No. 2,499,365, dated March 7, 1950, to De Grotte, et al., and offered for sale by numerous laboratory supply houses. This equipment is also described here for the reason that it is used in subsequent operations for the preparation of esters from polycarboxy acids or anhydrides and the hydroxylated oxypropylation products. This esterification procedure is described in Part 3.

If such arrangement is used to prepare laboratory-scale duplications then care should be taken that the heating mantle can be removed rapidly, so as to allow for cooling; or better still, through an added opening at the top of the glass resin pot or comparable vessel should be passed a stainless steel cooling coil so that the pot can be cooled more rapidly than by mere removal of mantle. If a stainless steel coil is introduced it means that the conventional stirrer of the paddle type is changed to one of the centrifugal type, which causes the fluid or reactants to mix due to swirling action in the center of the pot. Still better is the use of a metal laboratory autoclave of the kind previously described above, but in any event when the initial amount of glycide is added to a diol, for example, in order to convert it into a triol, the speed of reaction should be controlled by the usual factors such as (a) the addition of glycide; (b) the elimination of external heat; and (c) use of cooling so there is no undue rise in temperature. All the foregoing is merely conventional but is included due to the hazard in handling glycide.

The amount of catalyst used in oxypropylation may vary from as little as ½% up to 5%. The amount may vary during the oxypropylation period as exemplified by the addition of the catalyst at the very beginning of the reaction only and with no further addition. Needless to say, there is a comparatively high concentration of catalyst at the beginning of the reaction and a comparatively low concentration at the end; in fact, not infrequently the amount of catalyst at the end will be one-half of 1% sodium methylate, or caustic soda, or less. Catalyst can be added intermittently during the reaction period provided that suitable equipment is available. It is rather difficult to employ such equipment on a laboratory scale but it can be employed, of course, on a pilot plant scale or larger scale.

Needless to say, the residual catalyst need not be as low as ½%. It may be as much as 1% or 2%, which means that the catalyst added initially may be several times as much as indicated in the table, for example, in the subsequent table in Examples 1a to 6a, the amount of sodium methylate employed varied from about 7.0 grams to as much as 20 grams. In one instance, for example in Example 6a, the amount of sodium methylate employed represented approximately 20% to 25% of the initial reactive triol (glycerol). However, in all these instances the final percentage of caustic present was in the neighborhood of ½%. In some instances the amount of sodium methylate added as a catalyst initially might be in excess of the amount which could combine with the available hydroxyls, assuming that water or methyl alcohol, or some other low molal compound, were evolved. The addition of xylene may only yield a pasty mass. If this is inconvenient due to the particular equipment employed, the amount of xylene, or other solvent may be increased over the amount indicated in the next table. In other instances where an initial triol has a molecular weight of as much as several hundred the use of 20 grams of sodium methylate, for example, would mean the initial addition of about 4% or 5% of catalyst. Actually, the amount of catalyst added could be twice or two-and-a-half times this amount. The result would be, everything else equal, that the final product would simply have more residual catalyst.

One limitation of small-scale autoclave equipment (a gallon to a 2-gallon autoclave) is the difficulty involved in a suitable automatic device for adding a dry catalyst such as sodium methylate, during the reaction. This presents no problem on a large scale with larger size equipment and, thus, the same operation conducted in equipment of increased capacity means that all the catalyst need not be added at once but can be added intermittently in a predetermined amount based on an hourly rate or based on the addition of propylene oxide. For instance, in a large scale operation involving equipment having about twenty-five times the capacity of the autoclaves employed arrangements were made to introduce better than a gallon of propylene oxide (4,000 grams) per hour, along with the introduction of 20 grams of sodium methylate hourly during the operation period. The net result, as far as the final material was concerned, was the same, to wit, a residual alkaline catalyst equivalent to about ½% sodium methylate.

In the following examples sodium methylate was used as a catalyst. In many instances there is a question as to what extent alcoholysis takes place and sodium methylate is added to the hydroxylated reactant. In these particular examples the glycerol or other triol was mixed with an amount of sodium methylate as indicated and also with 200 to 500 grams of xylene. The mixture was placed in the resin type flask or equivalent as previously described and heated at the reflux point for two hours and then approximately 100 cc. of xylene was allowed to distill over and was caught in the trap. This xylene was discarded and replaced by an equal amount of xylene. If alcoholysis has taken place methyl alcohol would be present in the initial xylene distillate and presumably was removed.

Oxypropylation was conducted then in the usual manner, first sweeping out the equipment with nitrogen, setting the automatic controls and adding the propylene oxide in such manner that it was injected into the reaction vessel in 10 to 15 hours, provided there was no interruption due to excess temperature, pressure, etc. A specific example is included by way of illustration.

*Example 3a*

(The "a" series of examples appear in columns 11 and 12, including Examples 1a, 2a, etc., but 3a is described for purpose of illustration).

92 grams of glycerol were mixed with 10 grams of sodium methylate and 200 grams of xylene. The mixture was refluxed in the manner previously described and then placed in the autoclave and the pot completely flushed out with nitrogen. The autoclave was sealed, the automatic devices adjusted and set for injecting a total of 2030 grams of propylene oxide in a 12-hour period (approximately 150 grams per hour).

In some experiments the predetermined rate was as low as 100 grams per hour and as much as 300 grams per hour. The autoclaves used were identical except as to size, one being slightly less than one gallon in capacity and the other approximately 1¾ gallons.

During this particular experiment the temperature range varied from 118° to 128° C. The pressure varied from 33 to 43 pounds per square inch. This temperature and pressure range, incidentally, was used in all this series. The time required was 24 hours. This means that the experiment was started one day and was complete the next day. Actually, all addition of the oxide was probably complete in about 12 to 12 hours but for convenience anything less than 24 hours is still recorded as 24 hours.

The final product was a somewhat viscous very pale straw-colored fluid which was water-insoluble. It was characteristic of all the various end products obtained in this series. It was, of course, slightly alkaline due to the residual sodium methylate reaction product. A complete series is illustrated, with all pertinent data, in the following table. The molecular weight of the final product is based on the assumption that if reaction is complete and all evidence seems to point to this fact, and, of course, in light of what is said subsequently must represent a statistical average rather than a single trial.

| Ex. No. | Triol | Molecular Wt. | Amt. (grs.) | Xylene Added if any (grs.) | Sod. Methylate (grs.) | Propylene Oxide Added (grs.) | Molal Ratio | Time (hrs.) | Max. and Min. Temp., °C. | Max. and Min. Pres., p. s. i. | Molecular Wt. Final Prod. |
|---|---|---|---|---|---|---|---|---|---|---|---|
| 1a | Glycerol | 92 | 92 | 200 | 7.0 | 1,165 | 20:1 | 24 | 95-110 | 25-35 | 1,252 |
| 2a | do | 92 | 92 | 200 | 8.0 | 1,445 | 25:1 | 24 | 95-110 | 25-35 | 1,542 |
| 3a | do | 92 | 92 | 200 | 10.0 | 2,030 | 35:1 | 24 | 95-110 | 25-35 | 2,122 |
| 4a | do | 92 | 92 | 200 | 14.0 | 2,615 | 45:1 | 48 | 95-110 | 25-35 | 2,702 |
| 5a | do | 92 | 92 | 200 | 15.0 | 2,910 | 50:1 | 48 | 95-110 | 25-35 | 2,992 |
| 6a | do | 92 | 92 | 200 | 20.0 | 3,780 | 65:1 | 72 | 95-110 | 25-35 | 3,862 |
| 7a | 1,2,6-hexanetriol | 134 | 134 | 200 | 7.0 | 1,160 | 20:1 | 24 | 95-110 | 25-35 | 1,294 |
| 8a | do | 134 | 134 | 200 | 8.0 | 1,455 | 25:1 | 24 | 95-110 | 25-35 | 1,584 |
| 9a | do | 134 | 134 | 200 | 11.0 | 2,035 | 35:1 | 24 | 95-110 | 25-35 | 2,164 |
| 10a | do | 134 | 134 | 200 | 15.0 | 2,600 | 45:1 | 48 | 95-110 | 25-35 | 2,744 |
| 11a | do | 134 | 134 | 200 | 15.0 | 2,915 | 50:1 | 48 | 95-110 | 25-35 | 3,034 |
| 12a | do | 134 | 134 | 200 | 20.0 | 3,790 | 65:1 | 72 | 95-110 | 25-35 | 3,904 |
| 13a | Trimethylolpropane | 134 | 134 | 200 | 7.0 | 1,150 | 20:1 | 24 | 95-110 | 25-35 | 1,294 |
| 14a | do | 134 | 134 | 200 | 8.0 | 1,445 | 25:1 | 24 | 95-110 | 25-35 | 1,584 |
| 15a | do | 134 | 134 | 200 | 12.0 | 2,040 | 35:1 | 24 | 95-110 | 25-35 | 2,164 |
| 16a | do | 134 | 134 | 200 | 14.0 | 2,605 | 45:1 | 48 | 95-110 | 25-35 | 2,744 |
| 17a | do | 134 | 134 | 200 | 15.0 | 2,925 | 50:1 | 48 | 95-110 | 25-35 | 3,034 |
| 18a | do | 134 | 134 | 200 | 20.0 | 3,800 | 65:1 | 72 | 95-110 | 25-35 | 3,904 |
| 19a | A | 136 | 136 | 200 | 7.0 | 1,160 | 20:1 | 24 | 95-110 | 25-35 | 1,298 |
| 20a | A | 136 | 136 | 200 | 8.0 | 1,450 | 25:1 | 24 | 95-110 | 25-35 | 1,588 |
| 21a | A | 136 | 136 | 200 | 11.0 | 2,035 | 35:1 | 24 | 95-110 | 25-35 | 2,168 |
| 22a | A | 136 | 136 | 200 | 15.0 | 2,615 | 45:1 | 48 | 95-110 | 25-35 | 2,748 |
| 23a | A | 136 | 136 | 200 | 15.0 | 2,920 | 50:1 | 48 | 95-110 | 25-35 | 3,038 |
| 24a | A | 136 | 136 | 200 | 20.0 | 3,780 | 65:1 | 72 | 95-110 | 25-35 | 3,908 |
| 25a | B | 242 | 242 | 250 | 8.0 | 1,155 | 20:1 | 24 | 95-110 | 25-35 | 1,404 |
| 26a | B | 242 | 242 | 250 | 9.0 | 1,455 | 25:1 | 24 | 95-110 | 25-35 | 1,694 |
| 27a | B | 242 | 242 | 250 | 13.0 | 2,040 | 35:1 | 24 | 95-110 | 25-35 | 2,274 |
| 28a | B | 242 | 242 | 250 | 15.0 | 2,710 | 45:1 | 48 | 95-110 | 25-35 | 2,854 |
| 29a | B | 242 | 242 | 250 | 17.0 | 2,910 | 50:1 | 48 | 95-110 | 25-35 | 3,144 |
| 30a | B | 242 | 242 | 250 | 22.0 | 3,775 | 65:1 | 72 | 95-110 | 25-35 | 4,014 |
| 31a | C | 222 | 222 | 250 | 8.0 | 1,160 | 20:1 | 24 | 95-110 | 25-35 | 1,384 |
| 32a | C | 222 | 222 | 250 | 9.0 | 1,460 | 25:1 | 24 | 95-110 | 25-35 | 1,674 |
| 33a | C | 222 | 222 | 250 | 12.0 | 2,035 | 35:1 | 24 | 95-110 | 25-35 | 2,254 |
| 34a | C | 222 | 222 | 250 | 15.0 | 2,620 | 45:1 | 48 | 95-110 | 25-35 | 2,834 |
| 35a | C | 222 | 222 | 250 | 16.0 | 2,925 | 50:1 | 48 | 95-110 | 25-35 | 3,124 |
| 36a | C | 222 | 222 | 250 | 20.0 | 3,795 | 65:1 | 72 | 95-110 | 25-35 | 3,994 |
| 37a | D | 174 | 174 | 200 | 7.0 | 1,150 | 20:1 | 24 | 95-110 | 25-35 | 1,334 |
| 38a | D | 174 | 174 | 200 | 8.0 | 1,445 | 25:1 | 24 | 95-110 | 25-35 | 1,624 |
| 39a | D | 174 | 174 | 200 | 12.0 | 2,050 | 35:1 | 24 | 95-110 | 25-35 | 2,204 |
| 40a | D | 174 | 174 | 200 | 15.0 | 2,615 | 45:1 | 48 | 95-110 | 25-35 | 2,784 |
| 41a | D | 174 | 174 | 200 | 15.0 | 2,910 | 50:1 | 48 | 95-110 | 25-35 | 3,074 |
| 42a | D | 174 | 174 | 200 | 7.0 | 3,780 | 65:1 | 72 | 95-110 | 25-35 | 3,944 |
| 43a | E | 192 | 192 | 225 | 8.0 | 1,160 | 20:1 | 24 | 95-110 | 25-35 | 1,352 |
| 44a | E | 192 | 192 | 225 | 12.5 | 1,455 | 25:1 | 24 | 95-110 | 25-35 | 1,642 |
| 45a | E | 192 | 192 | 225 | 13.5 | 2,035 | 35:1 | 24 | 95-110 | 25-35 | 2,222 |
| 46a | E | 192 | 192 | 225 | 16.5 | 2,625 | 45:1 | 24 | 95-110 | 25-35 | 2,802 |
| 47a | E | 192 | 192 | 225 | 17.5 | 2,920 | 50:1 | 48 | 95-110 | 25-35 | 3,092 |
| 48a | E | 192 | 192 | 225 | 22.5 | 3,780 | 65:1 | 48 | 95-110 | 25-35 | 3,962 |

A—This triol obtained by reacting one mole of glycerol with one mole of ethylene oxide.
B—This triol obtained by reacting one mole of 1,2,6-hexanetriol with 2 moles of ethylene oxide.
C—This triol obtained by reacting one mole of normal butyl alcohol with 2 moles of glycide.
D—This triol obtained by reacting one mole of pentanediol-2,4 with one mole of glycide.
E—This triol obtained by reacting one mole of hexanediol-2,5 with one mole of glycide.
(Molecular weights for A, B, C, D and E are based on the assumption that completeness of reaction took place to form one single product only, although possibly involving a mixture of isomers.)

In examining the data in the previous tables it will be noted that in several instances a number of separate operations were involved in covering the range from approximately 1,000 molecular weight to approximately 4,000. Needless to say, if the range were somewhat higher, such as 5,000 or more, perhaps even a larger number would be required. For this reason for various purposes and particularly for examination of a number of oxypropylation products derived from the same raw material it was feasible to use a large autoclave, for instance, one of approximately 15 gallons capacity and split the batches as the operation proceeded. This will be illustrated by the following example which was conducted in such larger autoclave equipment with all the devices as previously noted in regard to the small autoclave.

*Example A*

| | Pounds |
|---|---|
| Glycerine | 44.5 |
| Caustic soda | 8.5 |
| Propylene oxide | 51.5 |

The operation was started by mixing the glycerine and caustic and heating to approximately 150° to 155° C., to drive off the water. The mixture was then allowed to cool to approximately 100° C., and the addition of propylene oxide started. The propylene oxide was added in 4¾ hours. The maximum temperature during this period of time was approximately 100° C. The maximum pressure was 30 pounds per square inch. As in the use of the small apparatus the oxide feed line was set so that the continuous flow of oxide maintained the indicated pressure and temperatures.

At the end of the indicated period the composition, based on both the presence and absence of sodium hydroxide, was as follows:

| | Per cent |
|---|---|
| Glycerine | 46.3 |
| Propylene oxide | 53.7 |
| Glycerine | 42.6 |
| Caustic soda | 8.1 |
| Propylene oxide | 49.3 |

48 pounds of the reaction mass were removed from the autoclave, leaving 56.5 pounds in the autoclave.

*Example B*

The autoclave, containing 56.5 pounds of the composition identified as Example A, preceding, was reacted under substantially the same conditions with an additional 42.5 pounds of propylene oxide. The time required was approximately 2½ hours for oxypropylation. The temperatures and pressures were substantially the same as in Example A, preceding. At the end of this period the composition, calculated both ways, was as follows:

| | Per cent |
|---|---|
| Glycerine | 25.5 |
| Propylene oxide | 74.5 |
| Glycerine | 24.35 |
| Caustic soda | 4.55 |
| Propylene oxide | 71.10 |

41 pounds of the reaction mass were removed from the autoclave, leaving 58 pounds in the autoclave.

Example C

The 58 pounds of reaction mass identified as Example B, preceding, were treated with an additional 42 pounds of propylene oxide. The time required for oxypropylation was 5 hours. The maximum temperature was 110° C. The maximum pressure was 30 pounds per square inch. At the end of this time the composition, calculated as before, was as follows:

| | Per cent |
|---|---|
| Glycerine | 14.5 |
| Propylene oxide | 85.5 |
| Glycerine | 14.1 |
| Caustic soda | 2.6 |
| Propylene oxide | 83.3 |

At the end of the reaction period 42.5 pounds of the reaction mass were removed from the autoclave, leaving 57.5 pounds in the autoclave.

Example D 57.5 pounds of reaction mass, identified as Example C, preceding, were treated with 42½ pounds of propylene oxide. The time required for reaction was 7 hours. The maximum temperature was approximately 95° C. The maximum pressure was 30 pounds per square inch. This operation, and all the previous operations, were all conducted, of course, as in the manner described in Example A, preceding.

The composition of the reaction mass including the caustic soda, was as follows:

| | Per cent |
|---|---|
| Glycerine | 8.1 |
| Caustic soda | 1.4 |
| Propylene oxide | 90.5 |

Somewhat over 40 pounds of material were removed from the reaction mass, leaving 59.5 pounds in the autoclave.

Example E

The 59.5 pounds of reaction mass identified as Example D, preceding, were treated with 42.5 pounds of propylene oxide. The time required for oxypropylation was 7 hours. The temperature of reaction was approximately 95° C. The maximum pressure was 30 pounds per square inch. The composition of the reaction mass, including the caustic, was as follows:

| | Per cent |
|---|---|
| Glycerine | 4.72 |
| Caustic soda | .78 |
| Propylene oxide | 94.50 |

40 pounds of reaction mass were removed from the autoclave, leaving approximately 62 pounds in the autoclave.

Example F

The 62 pounds of material remaining in the autoclave and identified as Example E, preceding, were treated with 22 pounds of propylene oxide. The time required was slightly less than 5 hours. The temperature of reaction was approximately 95° C., and the maximum pressure was 30 pounds per square inch. The composition of the product was as follows:

| | Per cent |
|---|---|
| Glycerine | 3.48 |
| Caustic soda | .57 |
| Propylene oxide | 95.95 |

8 pounds of reaction mass were removed from the autoclave.

Example G 76 pounds of reaction mass identified as Example F, preceding, and remaining in the autoclave, were treated with 15.5 pounds of propylene oxide. The time required for the addition of the propylene oxide was 5¾ hours. The temperature was 95° C. and the maximum pressure was 30 pounds per square inch. The composition at the end of the oxypropylation step was as follows:

| | Per cent |
|---|---|
| Glycerine | 2.98 |
| Caustic soda | .47 |
| Propylene oxide | 96.55 |

Slightly over 38 pounds of the reaction mass were removed from the autoclave.

Example H 53.25 pounds of the reaction mass identified as Example G, preceding, and remaining in the autoclave, were treated with 21.75 pounds of propylene oxide. The time required for the oxypropylation step was 5.5 hours. The maximum temperature was 95° C., and the maximum pressure 30 pounds per square inch. At the end of this time the composition was as follows:

| | Per cent |
|---|---|
| Glycerine | 2.13 |
| Caustic soda | .33 |
| Propylene oxide | 97.54 |

There was removed from the autoclave slightly over 8 pounds of reaction mass.

Example I

Slightly less than 67 pounds of reaction mass remaining in the autoclave was treated with slightly more than 13½ pounds of propylene oxide. The time of reaction was 7 hours. The maximum temperature was 99° C., and the maximum pressure was 30 pounds per square inch. The composition of the final product is indicated as

| | Per cent |
|---|---|
| Glycerine | 1.77 |
| Caustic soda | .27 |
| Propylene oxide | 97.95 |

The entire procedure, as previously pointed out, was the same as that described in regard to the use of the smaller autoclave and the method employed was the same as that described in Example A, preceding.

A procedure of the kind just enumerated, i. e., the preparation of Examples A to I, inclusive, provides opportunity to examine the samples of residual products removed from the autoclave for solubility, etc. For instance, in the series just noted the solubility test was made at the stage indicated by Example D. The product was freed from alkaline catalyst by any conventional procedure, or that previously noted. This product was still water-soluble in water, was dispersible in xylene but not completely soluble, and insoluble in kerosene. Example E was insoluble in water, soluble in xylene, and insoluble in kerosene. Example F was insoluble in water, soluble in xylene, and soluble in kerosene.

Such solubility test can be be made simply by shaking small amounts of the materials in a test tube with water, for instance, using 1% to 5% approximately based on the amount of water present. Needless to say, there is not complete conversion of propylene oxide into hydroxylated compounds. In other words, the actual molecular weight based on a statistical average is greater than the molecular weight determined by usual methods. Actually there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure. If any difficulty is encountered in the manufacture of the esters as described in Part 3 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patents previously mentioned.

Reference is again made to the fact that triols having ether linkages involving radicals having a larger number of carbon atoms than glycerol, for instance, radicals having 3, 4, 5 or 6 carbon atoms, will show water insolubility and xylene-solubility at a lower stage of oxypropylation which obviously means a lower molecular weight range. Needless to say, this would apply to a triol having more than one ether linkage as, for example, a triol in which two or more propyl groups have been introduced.

Previous reference has been made to the fact that the end products are, in essence, cogeneric mixtures which represent values on an average or statistical basis. This applies to the oxypropylation products and obviously must apply to the acidic esters obtained from oxypropylation products. Reference is made to the previous formula and also to the previous examples wherein it is obvious that the divalent radical $(C_3H_6O)_n$ appears. As far as illustration is concerned one need not limit oneself to a polyol such as a triol. Indeed, the situation would apply in even a more simplified case, such as that of a monohydric alcohol. Actually, when such oxypropylation products are derived in the manner here described from a hydroxylated material, one does not obtain a single derivative in which $n$ referred to above has one and only one value, for instance, 15, 20 or 40. Thus, one actually obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes, one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to the copending application of De Groote, Wirtel and Pettingill, Serial No. 109,791, filed August 11, 1949, now Patent No. 2,549,434, dated April 17, 1951.

However, momentarily referring again to a monohydric initial reactant it is obvious that if one selects any such simple hydroxylated compound and subjects such compound to oxyalkylation, such as oxyethylation, or oxypropylation, it becomes obvious that one is really producing a polymer of the alkylene oxide except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent which, for the sake of convenience, may be indicated as $RO(C_2H_4O)_{30}H$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental principles of condensation polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$ in formulas such as

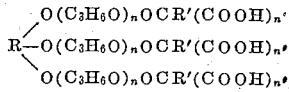

as representing both individual constituents in which $n$ has a single definite value, and also with the understanding that $n$ represents the average statistical value based on the assumption of completeness of reaction. In the formula immediately preceding the various characters have the same significance as stated in the introductory part of the specification.

Reviewing then the oxypropylated products described it will be noted that they come within the molecular weight of about 1,000 to 5,000. They represent a molal ratio of propylene oxide to hydroxylated reactant varying from 20 to 1 through the range of 90 to 1, or 6 to 30 per hydroxyl radical. The products are invariably water-insoluble notwithstanding the fact that initial hydroxylated material is water-soluble and that lower propylene glycols are water-soluble. In practically all instances the products are xylene-soluble and in the majority of cases kerosene-soluble. The preferred oxypropylated products are kerosene-soluble. My preferred molecular range is between 2,000 and 3,500.

PART 3

As previously pointed out the present invention is concerned with acidic esters obtained from the propylated derivatives described in Part 2, immediately preceding, and polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms, as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydride or any other obvious equivalents.

The production of esters including acid esters (fractional esters) from polycarboxy acids and glycols is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind previously described and particularly with one more opening to permit the use of a porous spreader if hydrochloric acid gas is to be used as a catalyst. Such device or absorption spreader consists of minute alundum thimbles which are connected to a glass tube. One can add a sulfonic acid such as para-toluene sulfonic acid as a catalyst. There is some objection to this because in some instances there is some evidence that this acid catalyst tends to decompose or rearrange heat oxypropylated compounds, and particularly likely to do so if the esterification temperature is too high. In the case of polycarboxy acids, such as diglycollic acid, which is strongly acidic there is no need to add any catalyst. The use of hydrochloric gas has one advantage over para-toluene sulfonic acid and that is that at the end of the reaction it can be removed by flushing out with nitrogen, whereas there is no reasonably convenient means available of removing the para-toluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material.

The products obtained in Part 2 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 2 is then diluted further with sufficient xylene so that one has obtained approximately a 65% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value or drop in hydroxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the sodium sulfate and probably the sodium chloride formed. The clear, somewhat viscous straw-colored amber liquid so obtained may contain a small amount of sodium sulfate or sodium chloride but, in any event, is perfectly acceptable for esterification in the manner described.

It is to be pointed out that the products here described are not polyesters in the sense that there is a plurality of both triol radicals and acid radicals; the product is characterized by having only one triol radical.

| Ex. No. | Oxypropylated Compound | Amt. Used (grs.) | Polycarboxy Compound | Amt. Used (grs.) | Amt. Xylene Used (grs.) | Catalyst used if any | Amt. Used | Time of Reflux (hrs.) |
|---|---|---|---|---|---|---|---|---|
| 1b | 4a | 540 | Adipic Acid | 88 | 250 | HCl | Trace | 2-4 |
| 2b | 4a | 540 | Phthalic Anhydride | 89 | 250 | | | 2-4 |
| 3b | 4a | 540 | Succinic Anhydride | 60 | 250 | | | 2-4 |
| 4b | 4a | 540 | Sebacic Acid | 121 | 250 | HCl | Trace | 2-4 |
| 5b | 4a | 540 | Azelaic Acid | 113 | 250 | HCl | do | 2-4 |
| 6b | 4a | 540 | Diglycollic Acid | 80 | 250 | | | 2-4 |
| 7b | 4a | 540 | Aconitic Acid | 104 | 250 | | | 2-4 |
| 8b | 5a | 600 | Adipic Acid | 88 | 300 | HCl | Trace | 2-4 |
| 9b | 5a | 600 | Phthalic Anhydride | 89 | 300 | | | 2-4 |
| 10b | 5a | 600 | Succinic Anhydride | 60 | 300 | | | 2-4 |

| Ex. No. | Oxypropylated Compound | Amt. Used (grs.) | Polycarboxy Compound | Amt. Used (grs.) | Amt. Xylene Used (grs.) | Catalyst used if any | Amt. Used | Time of Reflux (hrs.) |
|---|---|---|---|---|---|---|---|---|
| 11b | 5a | 600 | Sebacic Acid | 121 | 300 | HCl | Trace | 2-4 |
| 12b | 5a | 600 | Azelaic Acid | 113 | 300 | HCl | do | 2-4 |
| 13b | 5a | 600 | Diglycollic Acid | 80 | 300 | | | 2-4 |
| 14b | 5a | 600 | Aconitic Acid | 104 | 300 | | | 2-4 |
| 15b | 9a | 435 | Adipic Acid | 88 | 200 | HCl | Trace | 2-4 |
| 16b | 9a | 435 | Phthalic Anhydride | 89 | 200 | | | 2-4 |
| 17b | 9a | 435 | Succinic Anhydride | 60 | 200 | | | 2-4 |
| 18b | 9a | 435 | Sebacic Acid | 121 | 200 | HCl | Trace | 2-4 |
| 19b | 9a | 435 | Azelaic Acid | 113 | 200 | HCl | do | 2-4 |
| 20b | 9a | 435 | Diglycollic Acid | 80 | 200 | | | 2-4 |
| 21b | 9a | 435 | Aconitic Acid | 104 | 200 | | | 2-4 |
| 22b | 10a | 550 | Adipic Acid | 88 | 250 | HCl | Trace | 2-4 |
| 23b | 10a | 550 | Phthalic Anhydride | 89 | 250 | | | 2-4 |
| 24b | 10a | 550 | Succinic Anhydride | 60 | 250 | | | 2-4 |
| 25b | 10a | 550 | Sebacic Acid | 121 | 250 | HCl | Trace | 2-4 |
| 26b | 10a | 550 | Azelaic Acid | 113 | 250 | HCl | do | 2-4 |
| 27b | 10a | 550 | Diglycollic Acid | 80 | 250 | | | 2-4 |
| 28b | 10a | 550 | Aconitic Acid | 104 | 250 | | | 2-4 |
| 29b | 16a | 550 | Adipic Acid | 88 | 250 | HCl | Trace | 2-4 |
| 30b | 16a | 550 | Phthalic Anhydride | 89 | 250 | | | 2-4 |
| 31b | 16a | 550 | Succinic Anhydride | 60 | 250 | | | 2-4 |
| 32b | 16a | 550 | Sebacic Acid | 121 | 250 | HCl | Trace | 2-4 |
| 33b | 16a | 550 | Azelaic Acid | 113 | 250 | HCl | do | 2-4 |
| 34b | 16a | 550 | Diglycollic Acid | 80 | 250 | | | 2-4 |
| 35b | 16a | 550 | Aconitic Acid | 104 | 250 | | | 2-4 |
| 36b | 22a | 550 | Adipic Acid | 88 | 250 | HCl | Trace | 2-4 |
| 37b | 22a | 550 | Phthalic Anhydride | 89 | 250 | | | 2-4 |
| 38b | 22a | 550 | Succinic Anhydride | 60 | 250 | | | 2-4 |
| 39b | 22a | 550 | Sebacic Acid | 121 | 250 | HCl | Trace | 2-4 |
| 40b | 22a | 550 | Azelaic Acid | 113 | 250 | HCl | do | 2-4 |
| 41b | 22a | 550 | Diglycollic Acid | 80 | 250 | | | 2-4 |
| 42b | 22a | 550 | Aconitic Acid | 104 | 250 | | | 2-4 |
| 43b | 27a | 455 | Adipic Acid | 88 | 225 | HCl | Trace | 2-4 |
| 44b | 27a | 455 | Phthalic Anhydride | 89 | 225 | | | 2-4 |
| 45b | 27a | 455 | Succinic Anhydride | 60 | 225 | | | 2-4 |
| 46b | 27a | 455 | Sebacic Acid | 121 | 225 | HCl | Trace | 2-4 |
| 47b | 27a | 455 | Azelaic Acid | 113 | 225 | HCl | do | 2-4 |
| 48b | 27a | 455 | Diglycollic Acid | 80 | 225 | | | 2-4 |
| 49b | 27a | 455 | Aconitic Acid | 104 | 225 | | | 2-4 |
| 50b | 40a | 560 | Adipic Acid | 88 | 265 | HCl | Trace | 2-4 |
| 51b | 40a | 560 | Phthalic Anhydride | 89 | 265 | | | 2-4 |
| 52b | 40a | 560 | Succinic Anhydride | 60 | 265 | | | 2-4 |
| 53b | 40a | 560 | Sebacic Acid | 121 | 265 | HCl | Trace | 2-4 |
| 54b | 40a | 560 | Azelaic Acid | 113 | 265 | HCl | do | 2-4 |
| 55b | 40a | 560 | Diglycollic Acid | 80 | 265 | | | 2-4 |
| 56b | 40a | 560 | Aconitic Acid | 104 | 265 | | | 2-4 |
| 57b | 46a | 560 | Adipic Acid | 88 | 275 | HCl | Trace | 2-4 |
| 58b | 46a | 560 | Phthalic Anhydride | 89 | 275 | | | 2-4 |
| 59b | 46a | 560 | Succinic Anhydride | 60 | 275 | | | 2-4 |
| 60b | 46a | 560 | Sebacic Acid | 121 | 275 | HCl | Trace | 2-4 |
| 61b | 46a | 560 | Azelaic Acid | 113 | 275 | HCl | do | 2-4 |
| 62b | 46a | 560 | Diglycollic Acid | 80 | 275 | | | 2-4 |
| 63b | 46a | 560 | Aconitic Acid | 104 | 275 | | | 2-4 |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated glycerol and use a stoichiometrically equivalent amount of acid; (b) If the reaction does not proceed with xylene within an appreciable length of time, for instance, 4 to 6 hours, use a high boiling solvent such as cymene or other solvent as previously mentioned; (c) If necessary, use ½% of paratoluene sulfonic acid or some other acid as a catalyst; (d) If the esterification does not produce a clear product a check should be made to see if an inorganic salt such as sodium chloride or sodium sulfate is not precipitating out. Such salt should be permitted to remain or can be removed by filtering.

In some instances higher temperature than 150° C. must be employed. If xylene is used as the solvent part of the xylene can be eliminated through the phase-separating trap until the amount present is relatively small. This invariably has the effect of raising the boiling point of the mixture so the temperatures of 160° and 165° can be obtained readily. Over and above this other solvents, as previously suggested, can be employed to give temperatures of 170° C. or even higher. Everything else being equal as the size of the molecule increases and the reactive hydroxyl radical represents a smaller fraction of the entire molecule more difficulty is involved in obtaining complete esterification.

Even under the most carefully controlled conditions of oxypropylation involving comparatively low temperatures and long time of reaction there are formed certain compounds whose composition is still obscure. Such side reaction products can contribute a substantial proportion of the final co-generic reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde or allyl alcohol. In some instances attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the unreacted carboxyl radical which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any unreacted propylene oxide. Obviously this should be eliminated.

The solvent employed, if any, can be removed from the finished ester by distillation and particularly vacuum distillation. The final products or liquids are generally pale amber to amber in color, and show moderate viscosity. They can be bleached with bleaching clays, filtering chars, and the like. However, for the purpose of demulsification or the like color is not a factor and decolorization is not justified.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000.

As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 6b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 6b, 20%;

A cyclohexylamine salt of a polypropylated naphthalene mono-sulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described my invention, what I claim as new and desire to secure by Letters Patent, is:

1. A process for breaking petroleum emulsions of the water-in-oil type characterized by subjecting the emulsion to the action of a demulsifier including a monomeric acidic fractional ester of the following structure:

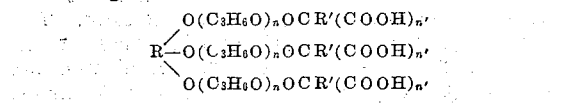

in which R is the radical of a water-soluble triol R(OH)₃ whose elements consist of carbon, hydrogen and oxygen only, and R' is the polycarboxy acid radical of the conventional polycarboxy acid

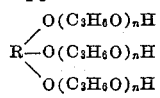

in which $n'$ represents the whole numbers 1 to 2, said radical R' containing only carbon to carbon, carbon to hydrogen, and ether linkages and $n$ represents a whole number varying from 6 to 30; with the proviso that $n$ be the statistical average based on the amount of propylene oxide reacted with the initial triol R(OH)₃; said triol being free from any radical having at least 8 uninterrupted carbon atoms; and with the further proviso that the oxypropylated triol

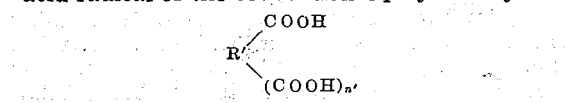

be water-insoluble and xylene-soluble, and that the statistical average molecular weight of said oxypropylated triols be within the range of 1,000 to 5,000.

2. The process of claim 1 wherein the molecular weight is within the range of 2,000 to 3,500.

3. The process of claim 1 wherein the molecular weight is within the range of 2,000 to 3,500, and $n'$ is one.

4. The process of claim 1 wherein the molecular weight is within the range of 2,000 to 3,500, $n'$ is one, and the oxypropylated triol is also kerosene-soluble.

5. The process of claim 1 wherein the molecular weight is within the range of 2,000 to 3,500, $n'$ is one, the oxypropylated triol is also kerosene-soluble, and R is the C₃H₅ radical.

6. The process of claim 1 wherein the molecular weight is within the range of 2,000 to 3,500, $n'$ is one, the oxypropylated triol is also kerosene-soluble, R is the C₃H₅ radical, and R' is the radical of adipic acid.

7. The process of claim 1 wherein the molecular weight is within the range of 2,000 to 3,500, $n'$ is one, the oxypropylated triol is also kerosene-soluble, R is the C₃H₅ radical, and R' is the radical of phthalic acid.

8. The process of claim 1 wherein the molecular weight is within the range of 2,000 to 3,500, $n'$ is one, the oxypropylated triol is also kerosene-soluble, R is the C₃H₅ radical, and R' is the radical of succinic acid.

9. The process of claim 1 wherein the molecular weight is within the range of 2,000 to 3,500, $n'$ is one, the oxypropylated triol is also kerosene-soluble, R is the C₃H₅ radical, and R' is the radical of diglycollic acid.

10. The process of claim 1 wherein the molecular weight is within the range of 2,000 to 3,500, $n'$ is one, the oxypropylated triol is also kerosene-soluble, R is the C₃H₅ radical, and R' is the radical of sebacic acid.

MELVIN DE GROOTE.

REFERENCES CITED

The following references are of record in the file of this patent:

UNITED STATES PATENTS

| Number | Name | Date |
|---|---|---|
| 2,307,058 | Moeller | Jan. 5, 1943 |
| 2,344,980 | De Groote et al. | Mar. 28, 1944 |
| 2,357,933 | De Groote et al. | Sept. 12, 1944 |
| 2,500,349 | De Groote et al. | Mar. 14, 1950 |